(12) United States Patent
Veselic

(10) Patent No.: US 7,170,259 B2
(45) Date of Patent: Jan. 30, 2007

(54) UNIVERSAL SERIAL BUS CHARGER FOR A MOBILE DEVICE

(75) Inventor: Dusan Veselic, Oakville (CA)

(73) Assignee: Research in Motion Limited, Waterloo (CA)

( * ) Notice: Subject to any disclaimer, the term of this patent is extended or adjusted under 35 U.S.C. 154(b) by 413 days.

(21) Appl. No.: 10/864,584

(22) Filed: Jun. 9, 2004

(65) Prior Publication Data

US 2004/0251878 A1 Dec. 16, 2004

(30) Foreign Application Priority Data

Jun. 11, 2003 (GB) ................................ 0313485.5

(51) Int. Cl.
*H02J 7/00* (2006.01)
(52) U.S. Cl. ...................................... 320/114; 320/106
(58) Field of Classification Search ................ 320/106, 320/114, 112
See application file for complete search history.

(56) References Cited

U.S. PATENT DOCUMENTS

| 2003/0052547 A1 | 3/2003 | Fischer et al. |
| 2003/0054703 A1 | 3/2003 | Fischer et al. |

FOREIGN PATENT DOCUMENTS

| EP | 0 684 680 A | 11/1995 |
| EP | 1 198 049 A1 | 4/2002 |

Primary Examiner—Karl Easthom
Assistant Examiner—Samuel Berhanu
(74) Attorney, Agent, or Firm—Jones Day; Krishna K. Pathiyal; Robert C. Liang

(57) ABSTRACT

In accordance with the teachings described herein, systems and methods are provided for charging a rechargeable power source in a mobile device through a USB port. A power converter may be used to receive an input voltage from an external power source and generate a charger output having a regulated voltage. A signal generator may be used to generate a charger configuration signal having pre-selected waveform characteristics that are selected to identify operating characteristics of the charging apparatus. A USB connector may be used for coupling the charger output and charger configuration signal to the USB port on the mobile device. The USB connector may include a voltage bus (Vbus) contact coupled to the charger output, a positive data (D+) contact coupled to the charger configuration signal, and a negative data (D−) contact coupled to the charger configuration signal. The charger configuration signal may be transmitted simultaneously to the D+ and D− contacts, such that the D+ and D− contacts are continuously either both in a logic high state or both in a logic low state. The mobile device may be configured to identify the operating characteristics of the charging apparatus from the waveform characteristics of the charger configuration signal and to apply the charger output to recharge the rechargeable power source.

16 Claims, 6 Drawing Sheets

UNIVERSAL SERIAL BUS CHARGER FOR A MOBILE DEVICE

CROSS-REFERENCE

This application claims the benefit of British Application No. 0313485.5 filed on Jun. 11, 2003 and entitled "Universal Serial Bus Charger For A Mobile Device," the entire disclosure of which is incorporated herein by reference.

FIELD

The technology described in this patent document relates generally to the field of power adapters. More particularly, this patent document describes a Universal Serial Bus (USB) charger that is particular well-suited for supplying power to a mobile device, such as a wireless two-way messaging device, a cellular telephone, a personal digital assistant (PDA), or other hand-held device having a rechargeable power source.

BACKGROUND

Providing an external source of power to a mobile device, such as a personal digital assistant ("PDA"), wireless two-way messaging device, cellular phone, and others, requires design considerations with respect to both the mobile device and the power source. With regard to the mobile device, most mobile devices provide a distinct power interface for receiving power from a power source, for instance to recharge a battery, and a separate data interface for communicating. For example, many mobile devices use USB (Universal Serial Bus) interfaces for communicating and use a separate power interface, such as a barrel connector, for receiving power.

SUMMARY

In accordance with the teachings described herein, systems and methods are provided for charging a rechargeable power source in a mobile device through a USB port. A power converter may be used to receive an input voltage from an external power source and generate a charger output having a regulated voltage. A signal generator may be used to generate a charger configuration signal having pre-selected waveform characteristics that are selected to identify operating characteristics of the charging apparatus. A USB connector may be used for coupling the charger output and charger configuration signal to the USB port on the mobile device. The USB connector may include a voltage bus (Vbus) contact coupled to the charger output, a positive data (D+) contact coupled to the charger configuration signal, and a negative data (D−) contact coupled to the charger configuration signal. The charger configuration signal may be transmitted simultaneously to the D+ and D− contacts, such that the D+ and D− contacts are continuously either both in a logic high state or both in a logic low state. The mobile device may be configured to identify the operating characteristics of the charging apparatus from the waveform characteristics of the charger configuration signal and to apply the charger output to recharge the rechargeable power source.

DETAILED DESCRIPTION

Figure 1:
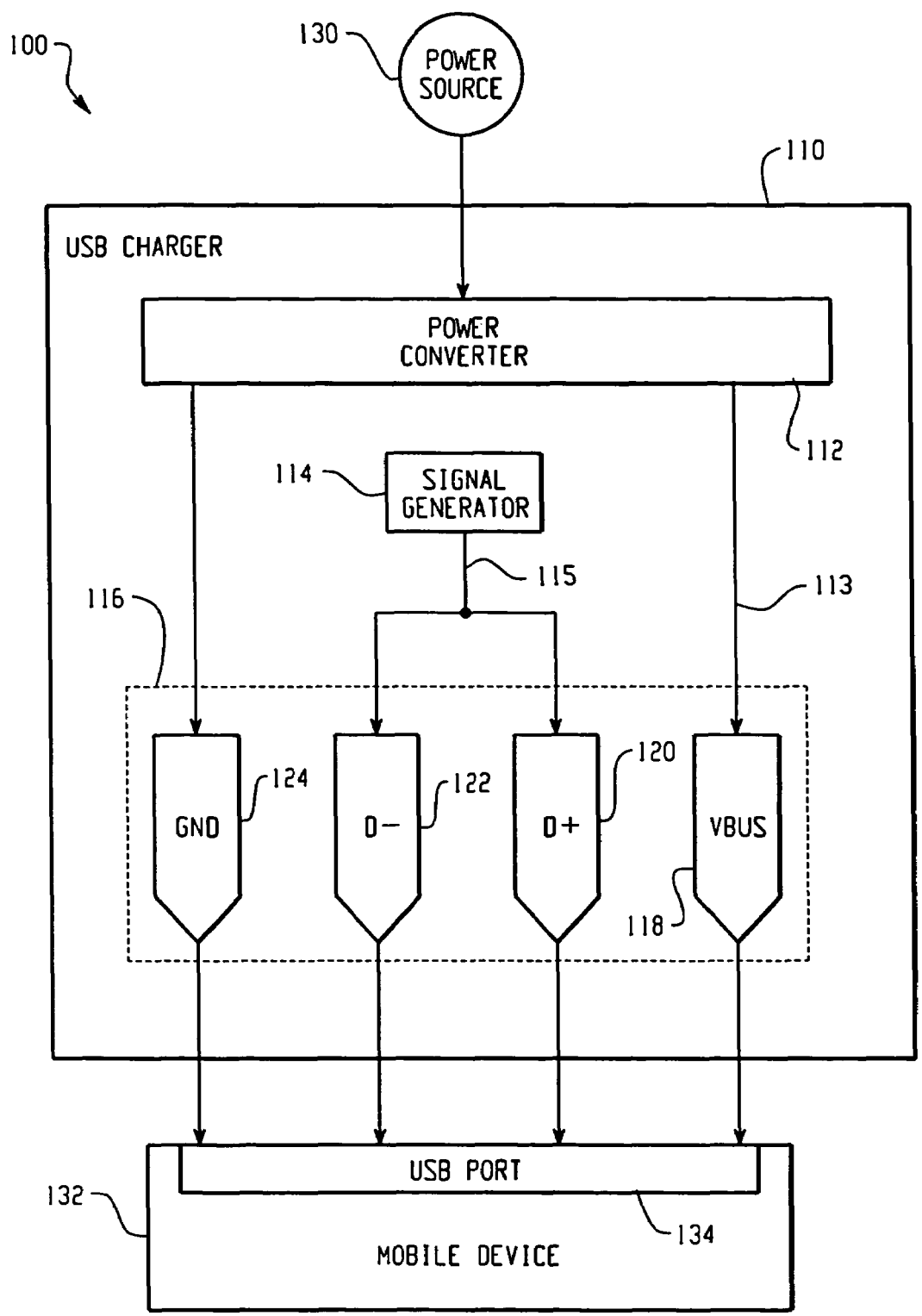
FIG. 1 is a block diagram of an example USB charger for charging a rechargeable power source in a mobile device.

With reference now to the drawing figures, FIG. 1 is a block diagram 100 of an example USB charger 110 for charging a rechargeable power source in a mobile device 132. The USB charger 110 includes a power converter 112, a signal generator 114, and a USB connector 116. Also illustrated are an external power source 130 and the mobile device 132.

The power converter 112 is configured to receive an input voltage from the external power source 130 and generate a charger output 113 having a regulated voltage. The USB charger 110 may be configured to operate with either an AC external power source 130, such as a conventional household power outlet, or a DC external power source 130, such as the power socket in an automobile. In the case of an AC power source 130, the power converter 112 may include an AC/DC converter that converts the AC input voltage of the external power source 130 into a regulated DC voltage at the charger output 113. If the external power source 130 is a DC power source, then the power converter 112 may include a DC/DC converter to generate the regulated DC voltage expected at the charger output 113.

The signal generator 114 is configured to generate a charger configuration signal 115, which is a periodic signal having pre-selected waveform characteristics that are selected to identify operating characteristics of the USB charger 110. The pre-selected waveform characteristics may, for example, include a constant operating frequency and duty-cycle. The operating characteristics identified by the pre-selected waveform characteristics of the charger configuration signal 115 may include the values of the regulated voltage and maximum current capability of the charger output 113, the model number of the charger, and/or other information relevant to the operation of the USB charger 110. Example waveform characteristics of the charger configuration signal 115 are described in more detail below with reference to FIG. 2.

The USB connector 116 is preferably a standard 4 pin USB connector having a voltage bus (Vbus) contact 118, a positive data (D+) contact 120, a negative data (D−) 122 contact, and a ground contact 124, as described in the Universal Serial Bus Specification, Revision 2.0, published Apr. 27, 2000. The Vbus contact 118 is coupled to the charger output 113 and both the D+ and D− contacts 120, 122 are coupled to the charger configuration signal 115. The ground contact 124 is coupled to a ground potential from the power converter 112, but could alternatively be coupled to another grounding source.

The mobile device 132 includes a USB port 134 that is coupled to the USB connector 116 of the USB charger 110. The mobile device 132 is configured to identify the operating characteristics of the charging apparatus 110 from the waveform characteristics of the charger configuration signal 115 and to apply the charger output 113 to recharge a rechargeable power source in the mobile device 132. The rechargeable power source in the mobile device 132 may, for example, be a rechargeable Lithium-Ion battery, or some other type of rechargeable battery. The USB port 134 on the mobile device 132 may be connected to the USB connector 116 of the USB charger 110 using a docking cradle, a standard USB cable, or by other suitable means. A detailed description of an example mobile device 132 is provided below with reference to FIG. 4.

In operation, the USB charger 110 transmits the charger configuration signal 113 to the mobile device 132 simultaneously on both the USB D+ and D− lines 120, 122, causing the D+ and D− lines to be continuously either both in a logic high state or both in a logic low state. In accordance with the USB Specification, a logic high state on both the D+ and D− lines signals an "Illegal" state, and a logic low state on both the D+ and D− lines signals a "Reset" state. Accordingly, simultaneous logic high or logic low states on the D+ and D− lines are not used during the transmission of data between a USB host and a USB peripheral device. Therefore, the mobile device 132 may be configured to recognize the presence of a charger configuration signal 113 transmitted simultaneously on the USB D+ and D− lines 120, 122, without interfering with the mobile device's ability to communication with a typical USB host device. For example, when the mobile device 132 detects power on the Vbus line 118, it may first attempt to establish a connection with a USB host using a standard USB enumeration process. If a USB host is not detected, then the mobile device 132 may monitor the D+ and D− lines 120, 122 for the presence of a charger configuration signal 113.

Once the mobile device 132 detects a charger configuration signal 113 on the USB D+ and D− lines 120, 122, the device 132 analyzes the waveform characteristics of the signal 113 to determine the operating characteristics of the USB charger 110. For instance, the mobile device 132 may determine the maximum current capability of the charger 110 from the charger configuration signal 113. The mobile device 132 may then draw power from the Vbus line 118 up to the maximum available current in order to charge its rechargeable power supply.

Figure 2:
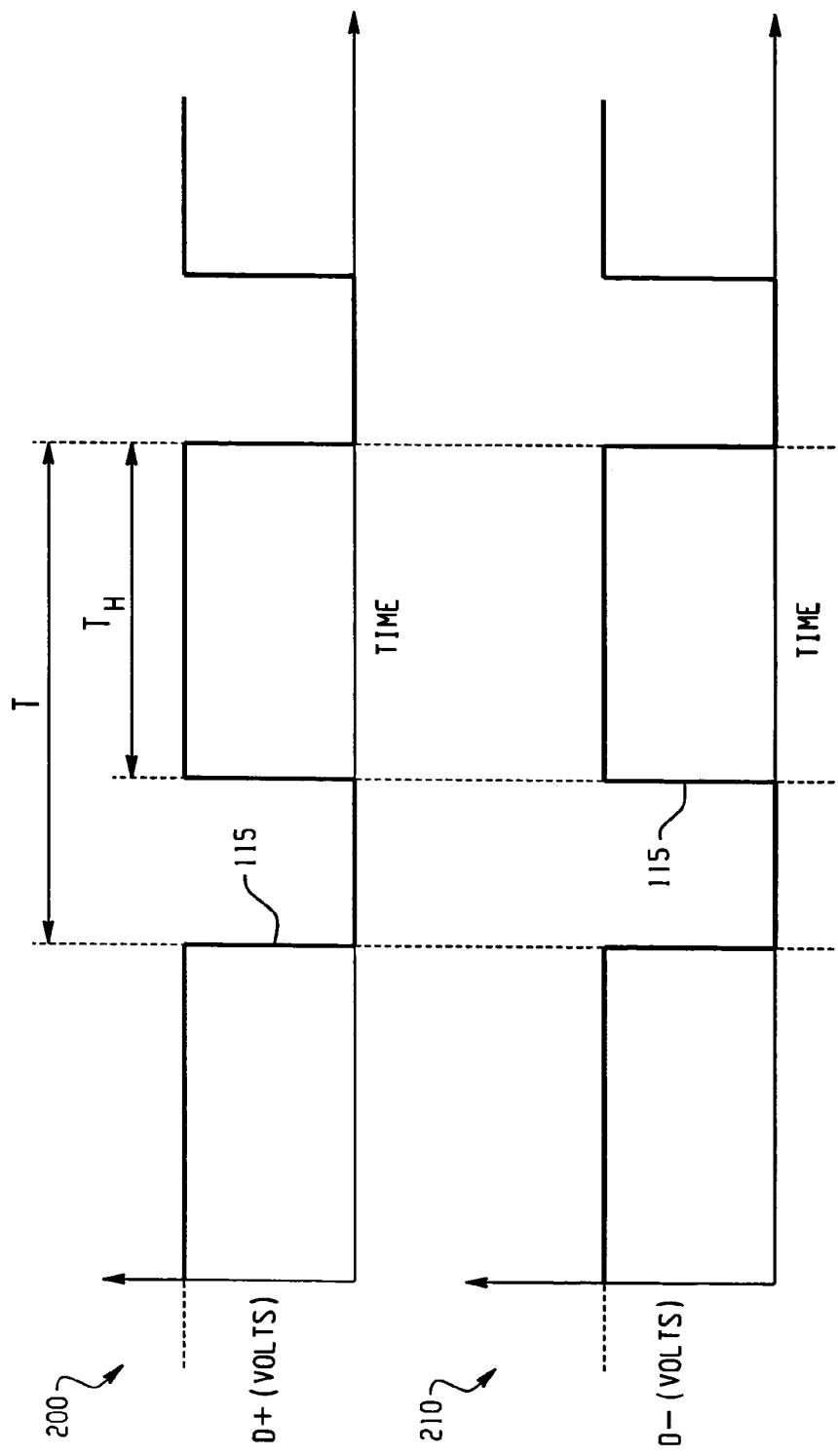
FIG. 2 illustrates an example charger configuration signal transmitted simultaneously on the USB D+ and D− lines shown in FIG. 1.

FIG. 2 illustrates an example charger configuration signal 115 transmitted simultaneously on the USB D+ and D− lines 120, 122, as shown in FIG. 1. FIG. 2 includes two graphs 200, 210, plotting the charger configuration signal 115 as a function of time for the D+ and D− lines, respectively. The illustrated charger configuration signal 115 is a periodic digital signal having a constant frequency ($1/T$) and a constant duty-cycle ($T_H/T$). As noted above, the frequency ($1/T$) and duty-cycle ($T_H/T$) of the signal 115 may be selected to identify certain operating characteristics of the USB charger 110. For example, the frequency ($1/T$) may identify the model and/or manufacturer of the charger 110, and the duty-cycle ($T_H/T$) may identify certain operating characteristics associated with the particular model charger 110, such as the voltage and/or maximum available current of the charger output 113.

Figure 3:
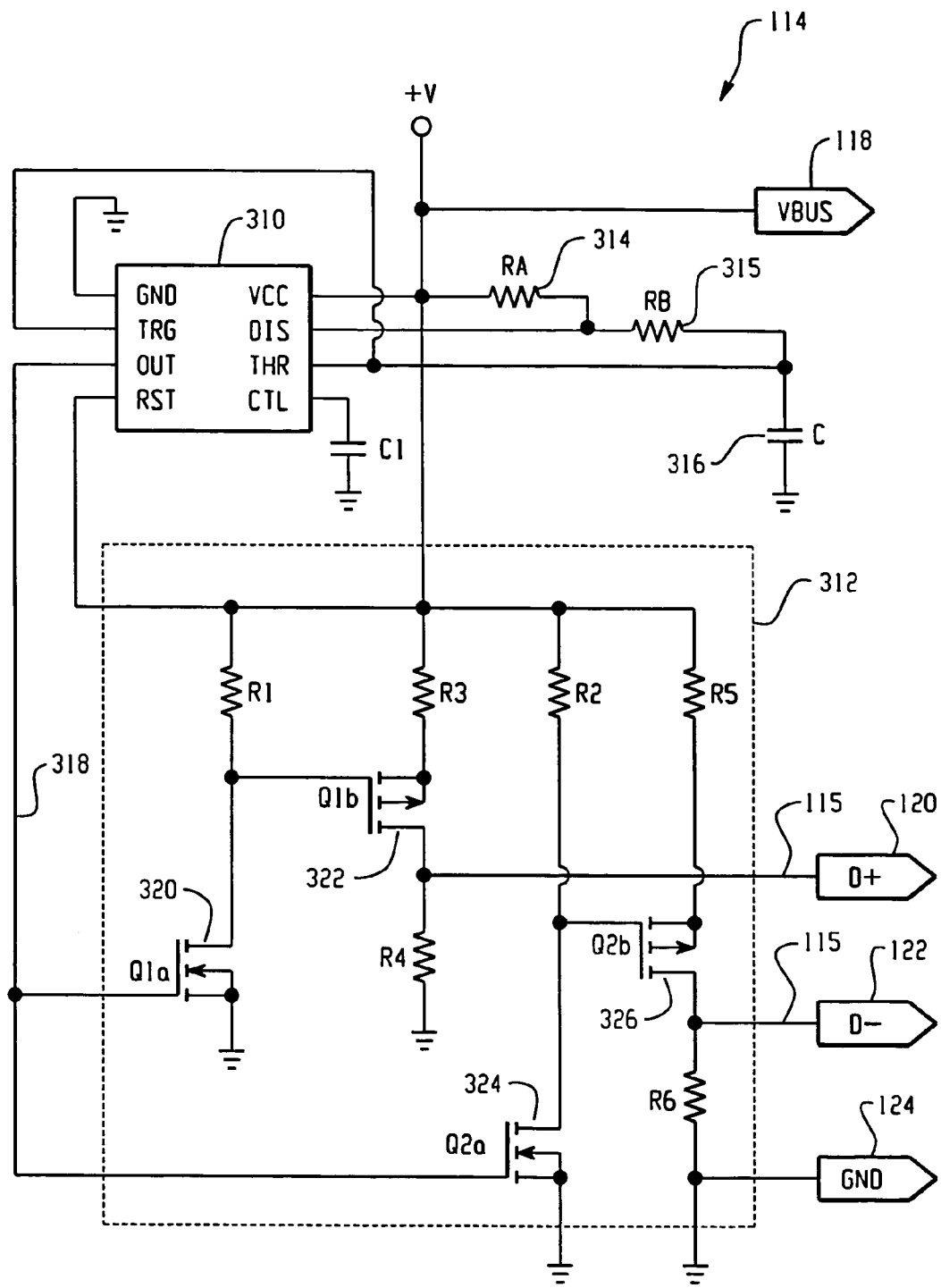
FIG. 3 is a circuit diagram of an example signal generator for the USB charger of FIG. 1.

FIG. 3 is a circuit diagram of an example signal generator 114 for the USB charger 110 of FIG. 1. The example signal generator 114 includes a digital timer 310, a switching circuit 312, and an RC circuit 314–316. In operation, the frequency and duty-cycle of the charger configuration signal 115 may be adjusted by selecting the resistor and capacitor values in the RC circuit 314–316.

The digital timer 310 may, for example, be a standard timer IC, such as an LM555 timer. The timer 310 generates a timer output signal 318 that may be tuned by varying the resistor and capacitor values in the RC circuit 314–316, which is coupled between the discharge (DIS) and threshold (THR) inputs of the timer 310. The timer output signal 318 is coupled as the inputs of two transistor pairs 320, 322 and 324, 326 in the switching circuit 312, which adjusts the peak voltage and impedance at the D+ and D− outputs 120, 122 to simulate those of a typical USB host. The values of the resistors (R1–R6) in the switching circuit 312 are chosen to set the output voltage and impedance at the D+ and D− outputs 120, 122. For example, the switching circuit 312 may regulate the voltage at the D+ and D− outputs 120, 122 to a peak voltage range between 3.0 to 3.6 volts and provide an output resistance between 14.25K and 24.8K Ohms, as required of USB hosts under the USB Specification.

Figure 4:
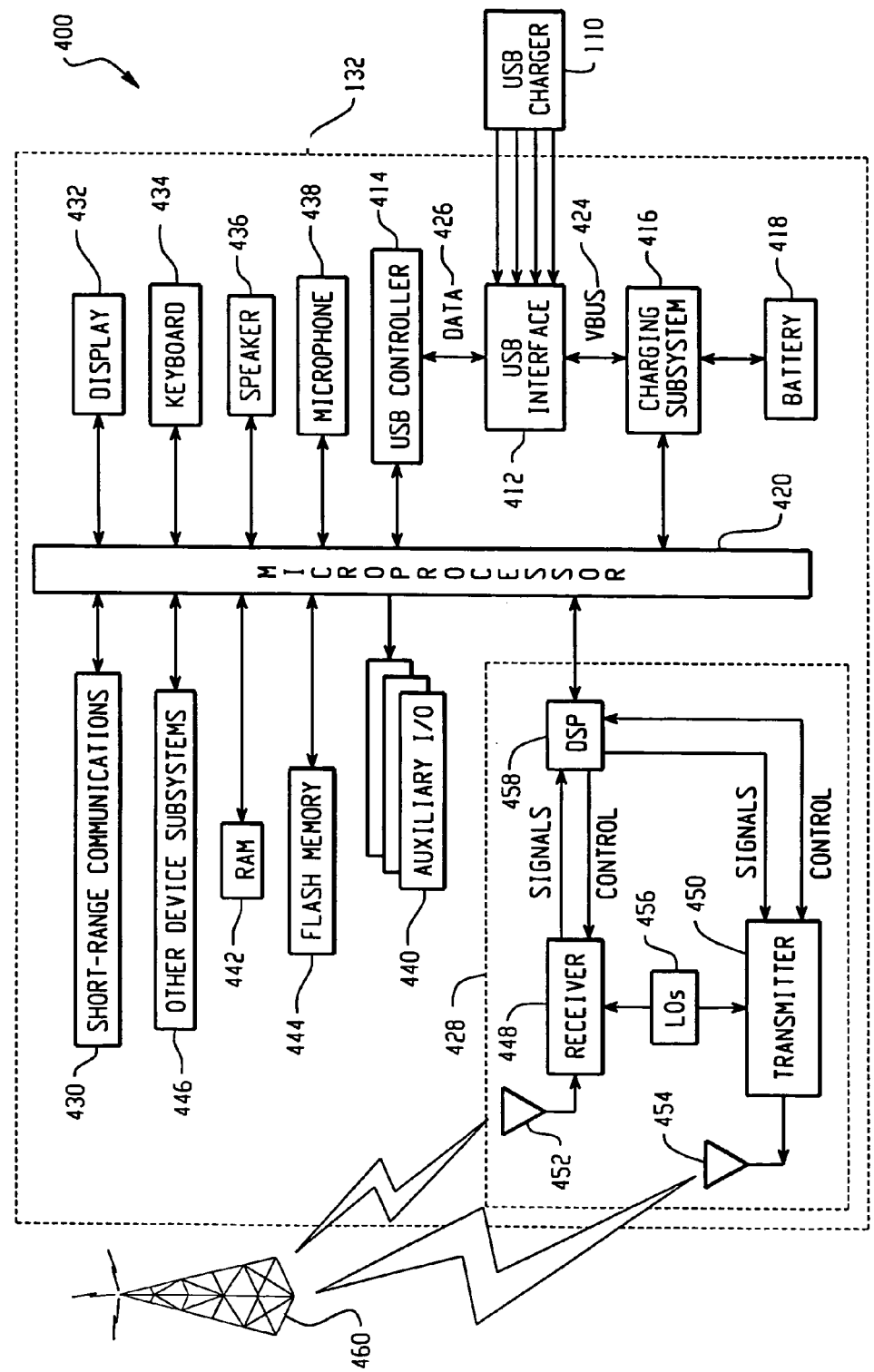
FIG. 4 is a block diagram of an example mobile device for use with a USB charger.

FIG. 4 is a block diagram of an exemplary mobile device 132 that includes a system for drawing power through a USB interface 412 from a USB charger 110. The mobile device 132 includes the USB interface 412, a USB controller 414, a charging subsystem 416, a rechargeable battery 418, and a processing device 420.

The USB interface 412 is coupled to the USB charger 110, as described above. The USB interface 412 includes a Vbus power line 424 that is coupled to the charging subsystem 416, and USB data lines 426 which are coupled to the USB controller 414. Operationally, the USB interface 412 is used by the mobile device 132 to provide power to the charging subsystem 416, and may also be used to communicate data between a USB host or hub (not shown) and the USB controller 414.

The charging subsystem 416 provides power to the mobile device 132, either from the rechargeable battery 418 or from the Vbus power line 424, and charges the rechargeable battery 418 from the Vbus power line 424. The USB controller 414 monitors the USB data lines 426, and controls data communication between the processing device 420 and a USB host. In addition, the USB controller 414 detects the presence of a USB charger 110 by identifying a charger configuration signal 115 on the D+ and D− lines, and determines the operational characteristics of the charger from the waveform characteristics of the charger configuration signal 115, as described above. For example, the mobile device 400 may maintain a look-up table used by the USB controller 414 to match identified waveform characteristics with corresponding charger operational characteristics, such as a maximum available current.

Upon detection of a charger configuration signal 114 by the USB controller 414, the identified operational characteristics of the USB charger 110 are provided to the charging subsystem 416, which instructs the USB interface 412 to begin drawing power from the Vbus line to charge the rechargeable battery 418. The charging subsystem 416 may, for example, instruct the USB interface 412 to draw power from the Vbus line up to a maximum available charge current identified from the charger configuration signal 114.

In addition to the subsystems and components described above, the mobile device 132 also may include a communications subsystem 428, a short-range communications subsystem 430, input/output devices 432–440, memory devices 442, 444, and various other device subsystems 446.

The processing device 420 controls the overall operation of the mobile device 132. Operating system software executed by the processing device 420 is preferably stored in a persistent store such as a flash memory 444, but may also be stored in other types of memory devices, such as a read only memory (ROM) or similar storage element. In addition, operating system software, specific device applications, or parts thereof, may be temporarily loaded into a volatile store, such as a random access memory (RAM) 442. Communication signals received by the mobile device 132 may also be stored to RAM 442.

The processing device 420, in addition to its operating system functions, enables execution of software applications on the device 132. A predetermined set of applications that control basic device operations, such as data and voice communications, may be installed on the device 132 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via the wireless network 460. Preferably, the PIM data items are seamlessly integrated, synchronized and updated via the wireless network 460 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 428, and possibly through the short-range communications subsystem 430. If the mobile device 132 is enabled for two-way communications, then the communication subsystem 428 includes a receiver 448, a transmitter 450, and a processing module 458, such as a digital signal processor (DSP). In addition, the communication subsystem 428, configured as a two-way communications device, includes one or more, preferably embedded or internal, antenna elements 452, 454, and local oscillators (LOs) 456. The specific design and implementation of the communication subsystem 428 is dependent upon the communication network 460 in which the mobile device 132 is intended to operate. For example, a device 132 destined for a North American market may include a communication subsystem 428 designed to operate within the Mobitex™ mobile communication system or DataTAC™ mobile communication system, whereas a device 132 intended for use in Europe may incorporate a General Packet Radio Service (GPRS) communication subsystem.

Network access requirements vary depending upon the type of communication system 460. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 132 may send and receive communication signals over the communication network 460. Signals received by the antenna 452 through the communication network 460 are input to the receiver 448, which may perform such common receiver functions as signal amplification, frequency down conversion, filtering, channel selection, and analog-to-digital conversion. Analog-to-digital conversion of the received signal allows the DSP to perform more complex communication functions, such as demodulation and decoding. In a similar manner, signals to be transmitted are processed by the DSP 458, and are the input to the transmitter 450 for digital-to-analog conversion, frequency up-conversion, filtering, amplification and transmission over the communication network 460 via the antenna 454.

In addition to processing communication signals, the DSP 458 provides for receiver 448 and transmitter 450 control. For example, gains applied to communication signals in the receiver 448 and transmitter 450 may be adaptively controlled through automatic gain control algorithms implemented in the DSP 458.

In a data communication mode, a received signal, such as a text message or web page download, is processed by the communication subsystem 428 and input to the processing device 420. The received signal is then further processed by the processing device 420 for output to a display 432, or alternatively to some other auxiliary I/O device 440. A device user may also compose data items, such as e-mail messages, using a keyboard 434, such as a QWERTY-style keyboard, and/or some other auxiliary I/O device 440, such as a touchpad, a rocker switch, a thumb-wheel, or some other type of input device. The composed data items may then be transmitted over the communication network 460 via the communication subsystem 428.

In a voice communication mode, overall operation of the device 132 is substantially similar to data communication mode, except that received signals are output to a speaker 436, and signals for transmission are generated by a microphone 438. Alternative voice or audio I/O subsystems, such as a voice message recording subsystem, may also be implemented on the device 132. In addition, the display 432 may also be utilized in voice communication mode, for example to display the identity of a calling party, the duration of a voice call, or other voice call related information.

The short-range communications subsystem 430 enables communication between the mobile device 132 and other proximate systems or devices, which need not necessarily be similar devices. For example, the short-range communications subsystem 430 may include an infrared device and associated circuits and components, or a Bluetooth™ communication module to provide for communication with similarly-enabled systems and devices.

Figure 5:
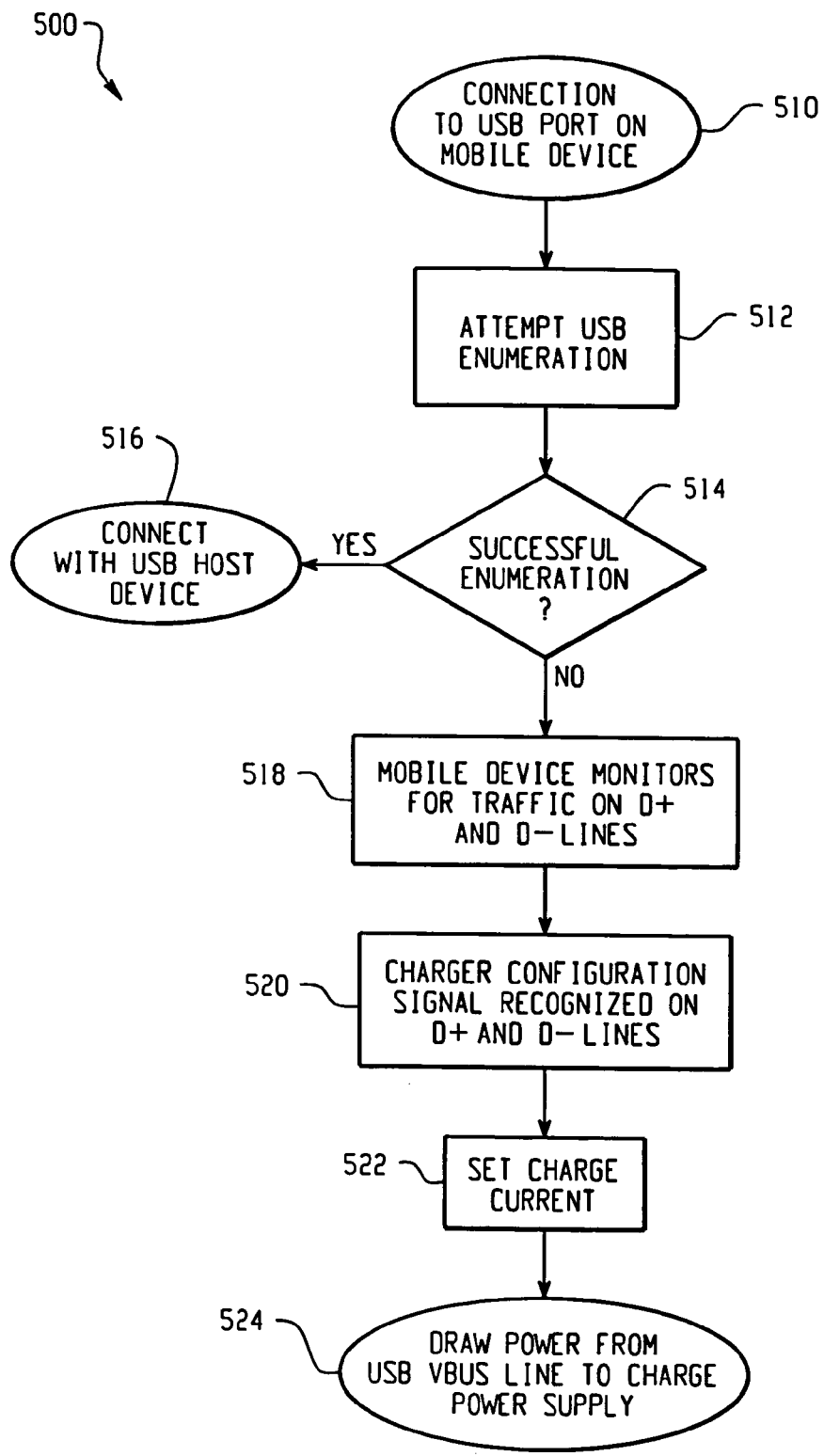
FIG. 5 is a flow diagram illustrating an example method for charging a rechargeable power source via a USB port in a mobile device.

FIG. 5 is a flow diagram illustrating an example method 500 for charging a rechargeable power source via a USB port in a mobile device. At step 510, an unknown device is connected to the USB port on the mobile device. At step 512, the mobile device attempts to signal the unknown device as a USB host. If the unknown device is a USB host, then a successful USB enumeration occurs at step 614, and the mobile device establishes communication with the USB host at step 516. If the unknown device is not a USB host, however, then a USB enumeration will not be initiated at step 514, and the mobile device monitors the D+ and D– lines for data traffic at step 618. If the unknown device is a USB charger, as described above, then a charger configuration signal is detected on the D+ and D– lines by the mobile device at step 520. The maximum available charger current of the USB charger is determined from the charger configuration signal, and a charge current is set accordingly at step 522. Then, at step 524, the mobile device draws power from the USB charger via the Vbus line up to the maximum available current.

Figure 6:
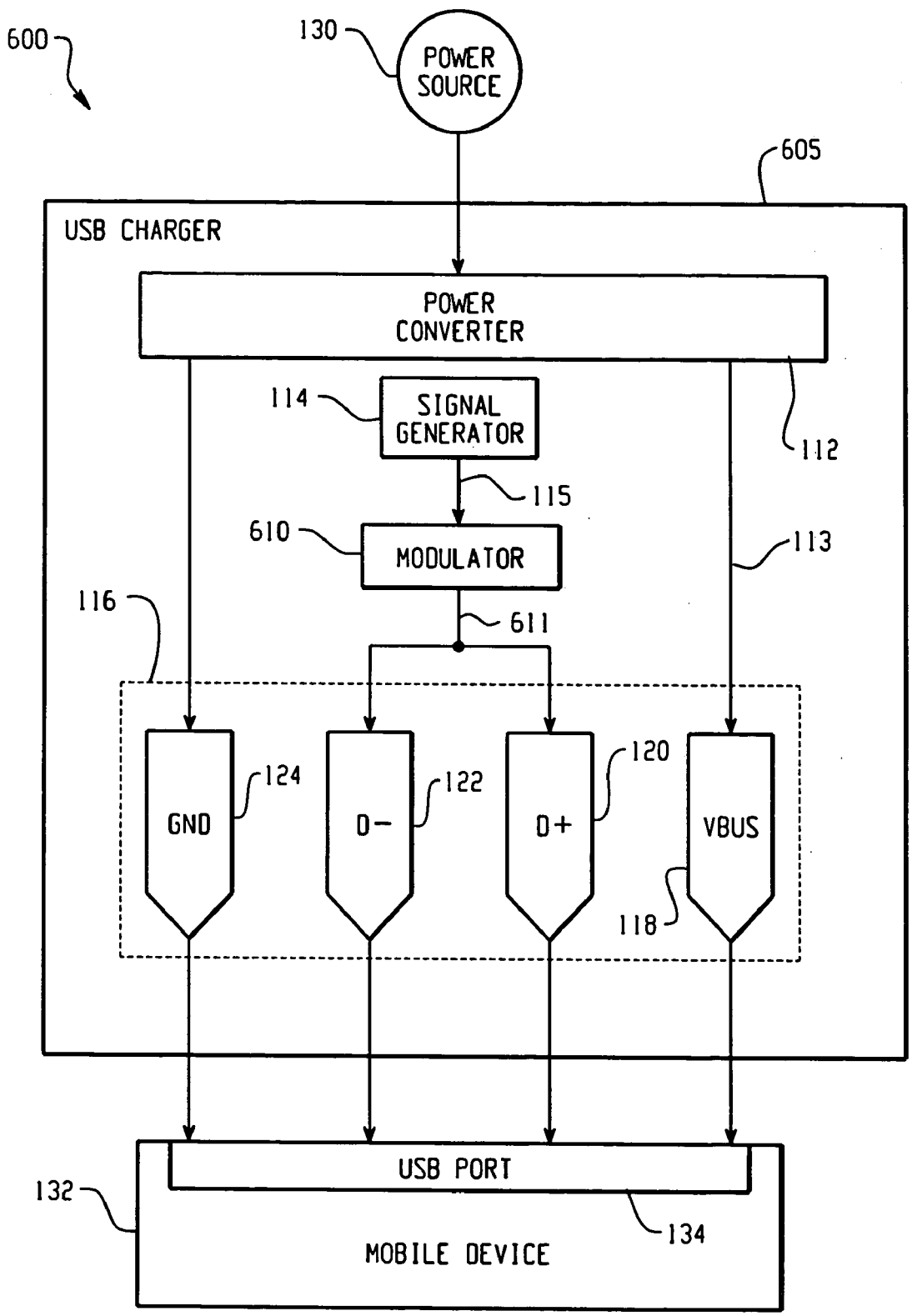
FIG. 6 is a block diagram of another example USB charger for charging a rechargeable power source in a mobile device.

This written description uses examples to disclose the invention, including the best mode, and also to enable a person skilled in the art to make and use the invention. The patentable scope of the invention may include other examples that occur to those skilled in the art. For example, FIG. 6 is a block diagram 600 of another example USB charger 605 for charging a rechargeable power source in a mobile device 132. This example USB charger 605 is similar to the USB charger 110 of FIG. 1, with the addition of a modulator 610 coupled between the signal generator 114 and the D+ and D− contacts 120, 122. In this embodiment, the frequency and duty cycle of the periodic output 115 from the signal generator 114 may be modulated by the modulator 610 in order to generate a modulated charger configuration signal 611 on the D+ and D− lines 120, 122. In this manner, additional information regarding the USB charger 605 may be encoded into the charger configuration signal 611 and transmitted to the mobile device 132.

The invention claimed is:

1. A charging apparatus for charging a rechargeable power source in a mobile device through a Universal Serial Bus (USB) port, comprising:
   a power converter configured to receive an input voltage from an external power source and generate a charger output having a regulated voltage;
   a signal generator configured to generate a charger configuration signal having a pre-selected frequency and duty-cycle, wherein the frequency and duty-cycle of the charger configuration signal are selected to identify operating characteristics of the charging apparatus, including at least the values of the regulated voltage an a maximum current capability of the charger output; and
   a USB connector for coupling the charger output and the charger configuration signal to the USB port of the mobile device, the USB connector having a voltage bus (Vbus) contact coupled to the charger output, a positive data (D+) contact coupled to the charger configuration signal, and a negative data (D−) contact coupled to the charger configuration signal, the charger configuration signal being transmitted simultaneously to the D+ and D− contacts, such that the D+ and D− contacts are continuously either both in a logic high state or both in a logic low state;
   wherein the mobile device is configured to identify the operating characteristics of the charging apparatus from the frequency and duty-cycle of the charger configuration signal and apply the charger output to recharge the rechargeable power source.

2. The charging apparatus of claim 1, wherein the operating characteristics identified by the charger configuration signal include a model number for the charging apparatus.

3. The charging apparatus of claim 1, wherein the pre-selected frequency of the charger configuration signal is a constant frequency that is pre-selected to identify a model of the charging apparatus.

4. The charging apparatus of claim 1, wherein the pre-selected duty-cycle of the charger configuration signal is a constant duty-cycle that is pre-selected to identify the values of the regulated voltage and maximum current capability of the charger output.

5. The charging apparatus of claim 1, wherein the external power source is a household AC power outlet, and wherein the power converter functions as an AC to DC converter.

6. The charging apparatus of claim 1, wherein the external power source is a DC power source.

7. The charging apparatus of claim 1, wherein the signal generator includes a digital timing circuit that is configured to generate the charger configuration signal.

8. The charging apparatus of claim 7, wherein the digital timing circuit includes:
   a digital timer that is configured to generate an output signal having a constant frequency and a constant duty-cycle; and
   a switching circuit coupled between the output signal of the digital timer and the D+ and D− contacts of the USB connector, the switching circuit being configured to regulate the peak voltage of the output signal to generate the charger configuration signal.

9. The charging apparatus of claim 8, wherein the switching circuit is configured to provide a pre-selected resistance.

10. The charging apparatus of claim 1, wherein the signal generator includes an analog timing circuit that is configured to generate the charger configuration signal.

11. A method of charging a rechargeable power source in a mobile device, comprising the steps of:
    generating a charger output having a regulated voltage and a maximum current capacity;
    generating a charger configuration signal having pre-selected waveform characteristics, the waveform characteristics including a pre-selected duty-cycle that identifies values of the regulated voltage and the maximum current capacity of the charger output; and
    coupling the charger output and charger configuration signal to the mobile device via a Universal Serial Bus (USB) port on the mobile device, the charger configuration signal being coupled to both a positive data (D+) contact and a negative data (D−) contact of the USB port and the regulated voltage being coupled to a voltage bus (Vbus) contact of the USB port;
    wherein the charger configuration signal is transmitted simultaneously to the D+ and D− contacts of the USB port, such that the D+ and D− contacts are continuously either both in a logic high state or both in a logic low state;
    wherein the mobile device is configured to identify the values of the regulated voltage and maximum current capacity of the charger output from the pre-selected duty-cycle of the charger configuration signal and to apply the charger output to recharge the rechargeable power source.

12. The method of claim 11, wherein the pre-selected waveform characteristics include a pre-selected frequency that identifies a model of a charging apparatus.

13. A method for charging a rechargeable power source in a mobile device, comprising:
    detecting an electrical connection between a Universal Serial Bus (USB) port on the device and an external device;
    attempting to initiate a USB enumeration procedure with the external device;
    if an enumeration acknowledgement signal is not received from the external device, then monitoring a positive data (D+) contact and a negative data (D−) contact of the USB port for a charger configuration signal, the charger configuration signal being transmitted simultaneously on the D+ and D− contacts of the USB port such that the charger configuration signal causes the D+ and D− contacts to be continuously either both in a logic high state or both in a logic low state; and
    if a charger configuration signal is detected, then determining a regulated voltage value and a maximum current value for the external device from waveform characteristics of the charger configuration signal and configuring the mobile device using the regulated voltage value and the maximum current value to charge the rechargeable power source from the external device.

14. The method of claim 13, wherein the waveform characteristics of the charger configuration signal include a constant duty-cycle that is pre-selected to identify the regulated voltage value and the maximum current value.

15. The method of claim 13, further comprising:
determining a model type of the external device from the waveform characteristic of the charger configuration signal and using the model type to configure the mobile device to charge the rechargeable power source from the external device.

16. The method of claim 15, wherein the waveform characteristics of the charger configuration signal include a constant frequency that is pre-selected to identify the model type.

* * * * *